United States Patent [19]

Manser et al.

[11] Patent Number: 5,210,153

[45] Date of Patent: May 11, 1993

[54] THERMOPLASTIC ELASTOMERS HAVING ALTERNATE CRYSTALLINE STRUCTURE FOR US AS HIGH ENERGY BINDERS

[76] Inventors: Gerald E. Manser, 112 Miller Way, Folsom, Calif. 95630; Richard S. Miller, 1749 Dana St., Crafton, Md. 21114

[21] Appl. No.: 815,878

[22] Filed: Jan. 6, 1992

Related U.S. Application Data

[63] Continuation of Ser. No. 370,351, Jun. 22, 1989, abandoned, which is a continuation of Ser. No. 925,660, Oct. 29, 1986, abandoned.

[51] Int. Cl.$^5$ .................... C08G 65/18; C08G 65/20
[52] U.S. Cl. .................... 525/410; 525/186; 525/206; 525/251; 525/412; 525/299; 528/408; 528/417; 149/19.6
[58] Field of Search ............... 525/410, 186, 206, 251, 525/412, 299; 528/408, 417; 149/19.6

[56] References Cited

U.S. PATENT DOCUMENTS

| | | | |
|---|---|---|---|
| 3,636,132 | 1/1972 | Saegusa et al. | 525/410 |
| 3,644,567 | 2/1972 | Smith et al. | 525/410 |
| 3,975,459 | 8/1976 | Schmidt et al. | 525/918 |
| 4,163,832 | 8/1979 | Oswald | 528/380 |
| 4,361,526 | 11/1982 | Allen | 264/3 |
| 4,393,199 | 7/1983 | Manser . | |
| 4,405,762 | 9/1983 | Earl et al. | 525/417 |
| 4,483,978 | 11/1984 | Manser | 528/408 |
| 4,597,924 | 7/1986 | Allen et al. | 149/19.91 |
| 4,707,540 | 11/1987 | Manser et al. | 528/362 |
| 4,806,613 | 2/1989 | Wardle | 528/59 |
| 4,833,183 | 5/1989 | Vandenberg | 525/410 |
| 4,952,644 | 8/1990 | Wardle | 525/410 |

FOREIGN PATENT DOCUMENTS

| | | | |
|---|---|---|---|
| 4807719 | 3/1973 | Japan | 525/410 |
| 4835959 | 10/1973 | Japan | 525/410 |
| 758450 | 10/1956 | United Kingdom | 528/417 |

OTHER PUBLICATIONS

Translation of Japan 48-7719, Mar. 1973.

*Primary Examiner*—James J. Seidleck
*Assistant Examiner*—Vasu S. Jagannathan

[57] ABSTRACT

Novel block polymers which are thermoplastic elastomers which are thermoplastic elastomers are provided for use as binders in high-energy compositions such as propellants, explosives, gasifiers or the like. The block polymers have an ABA structure wherein the A blocks are crystalline at temperatures below 60° C. and the B blocks are amorphous at temperatures above −20° C. Both the A and B blocks are polyethers formed from monomers of oxetanes and/or tetrahydrofuran. The block polymers melt in the range of 60° C. to 120° C. and have low viscosities above their melting points due to mutual miscibility of the A and B blocks.

7 Claims, No Drawings

THERMOPLASTIC ELASTOMERS HAVING ALTERNATE CRYSTALLINE STRUCTURE FOR US AS HIGH ENERGY BINDERS

This is a continuation of application Ser. No. 07/370,351, filed Jun. 22, 1989, now abandoned which is a continuation of application Ser. No. 06/925,660 filed Oct. 29, 1986, now abandoned.

The present invention relates to novel thermoplastic polymers which are useful as binders in high-energy formulations, such as propellants, explosives, gasifiers or the like.

BACKGROUND OF THE INVENTION

Solid high-energy compositions, such as propellants, explosives, gasifiers or the like, comprise solid particulates, such as fuel particulates and oxidizer particulates, dispersed and immobilized throughout a binder matrix comprising an elastomeric polymer.

Conventional solid composite propellant binders utilize cross-linked elastomers in which prepolymers are cross-linked by chemical curing agents. As outlined in detail in U.S. Pat. No. 4,361,526, there are important disadvantages to using cross-linked elastomers as binders. Cross-linked elastomers must be cast within a short period of time after addition of the curative, which time period is known as the "pot life". Disposal of a cast cross-linked propellant composition is difficult except by burning which poses environmental problems. Furthermore, current state-of-the-art propellant formulations have serious problems that include, but are not limited to, use of nonenergetic binders, high end-of-mix viscosities, thermally labile urethane linkages, and extreme vulnerability to unscheduled detonation.

Cross-linked elastomers in which prepolymers are polyethers derived from oxetane derivatives and tetrahydrofuran (THF) are described in U.S. Pat. No. 4,483,978 issued to Manser. Urethane curing is achieved with isocyanates and additional cross-linking agents.

In view of inherent disadvantages of cross-linked elastomers polymers as binder materials, there has been considerable interest in developing thermoplastic elastomers suitable as binders for solid, high-energy compositions. However, many thermoplastic elastomers fail to meet various requirements for propellant formulations, particularly the requirement of being processible below about 120° C., it being desirable that a thermoplastic polymer for use as a binder in a high-energy system have a melting temperature of between about 60° C. and about 120° C. Many thermoplastic elastomers exhibit high melt viscosities which preclude high solids loading and many show considerable creep and/or shrinkage after processing.

Thermoplastic elastomers (TPE's) typically obtain their thermoplastic properties from segments that form glassy domains which may contribute to physical properties adverse to their use as binders. Thermoplastic elastomers are block copolymers with the property of forming physical cross-links at predetermined temperatures. The classical TPE, e.g., Kraton, obtains this property by having the glass transition point of one component block above room temperature. At temperatures below 109° C., the glassy blocks of Kraton form glassy domains and thus physically cross-link the amorphous segments. The strength of these elastomers depends on the degree of phase separation. Thus, it remains desirable to have controlled, but significant, immiscibility between the two types of blocks, which is a function of their chemical structure and molecular weight. On the other hand, as the blocks become more immiscible, the melt viscosity increases, thus having a deleterious effect on the processibility of the material.

Above-mentioned U.S. Pat. No. 4,361,526 proposes a thermoplastic elastomer binder which is a block copolymer of a diene and styrene, the styrene blocks providing a meltable crystal structure and the diene blocks imparting rubbery or elastomeric properties to the copolymer. This polymer requires processing with solvent, which is undesirable in that the propellant cannot be cast in a conventional manner, e.g., into a rocket motor casing. Furthermore, solvent-based processing presents problems with respect to removal and recovery of solvent.

There exists a need for novel thermoplastic elastomers which can be used as binders in high-energy compositions.

SUMMARY OF THE INVENTION

In accordance with the present invention, novel thermoplastic elastomers are produced which have physical properties which are highly suitable for use in binder systems for high-energy compositions, such as propellants, explosives, gasifiers or the like. The novel elastomers are ABA triblock polymers in which the end (A) blocks are crystalline at usual ambient temperatures and the central (B) block is amorphous at usual ambient temperatures. The triblock polymers have the added feature that the A and B blocks are mutually miscible in a melt of the polymer. The melt viscosities of such triblock polymers decrease rapidly as the temperature is raised above the melting point of the crystalline (A) blocks, contributing to their processability. Furthermore, thermoplastic elastomers based upon crystalline domains exhibit advantageous solvent-resistance and minimal setup shrinkage $AB_n$ and star polymers having similar characteristics are also within the scope of the present invention.

Both the crystalline (A) and amorphous (B) blocks of the polymers in accordance with the invention are polyethers derived from cyclic ethers, such as oxetane and oxetane derivatives and tetrahydrofuran (THF) and tetrahydrofuran derivatives. The mer units of the end (A) blocks are selected for providing a crystalline structure at usual ambient temperatures, whereas the mer units or combination of mer units of the central (B) block are selected to ensure an amorphous structure at usual ambient temperature.

Block polymers in accordance with the present invention have melting temperatures which may fall within a desirable 60° C. to 120° C. range, are chemically stable up to 120° C. or above, having low melt viscosities and are therefor processable in state-of-the-art equipment, are compatible with existing components of high-energy compositions, retain mechanical integrity when filled with solids up to 90 percent w/w and have glass transition temperatures below $-20°$ C. and preferably below $-40°$ C.

DETAILED DESCRIPTION OF CERTAIN PREFERRED EMBODIMENTS

In accordance with the present invention, thermoplastic elastomeric ABA triblock polymers are produced wherein the end A blocks are crystalline at temperatures below about 60° C. and preferably at temperatures at below about 75° C., whereas the central B block is amorphous at temperatures down to about $-20°$ C.

and preferably down to about −40° C. Each of the A and B blocks are polyethers derived from cyclic ethers, including oxetane and oxetane derivatives and THF and THF derivatives. The polymers melt at temperatures between about 60° C. and about 120° C. and preferably between about 75° C. and about 100° C. The A and B blocks are mutually miscible in the melt; consequently, the melt viscosity of the copolymer decreases rapidly as the temperature is raised above the melting point, whereby high energy formulations may include high solids content, e.g., up to about 90%, and be easily processed. The invention also includes other polymers, such as $AB_n$ polymers and AB star polymers, in which at least one pair of crystalline A blocks flanks at least one amorphous B block.

Contributing to the miscibility of the A and B blocks is their similar structure, each being formed of mer units derived from cyclic ethers. Oxetane and tetrahydrofuran (THF) mer units used in forming the blocks of the present invention have the general formulae:

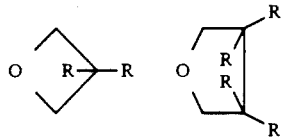

wherein the R groups are the same or different and are selected from moieties having the general formulae: $-(CH_2)_nX$, where n is 0–10 and X is selected from the group consisting of —H, —NO₂, —CN, —Cl, F, —O—alkyl, —OH, —I, —ONO₂, —N(NO₂)—alkyl, —C≡CH, —Br, —CH=CH(H or alkyl), —O—CO—(H or alkyl), —CO₂—(H or alkyl), —N(H or alkyl)₂, and —O—(CH₂)₁₋₅—O—(CH₂)₀₋₈—CH₃.

Examples of oxetanes used in forming block polymers in accordance with the invention include but are not limited to:

| | |
|---|---|
| BEMO | 3,3-bis(ethoxymethyl)oxetane |
| BCMO | 3,3-bis(chloromethyl)oxetane |
| BMMO | 3,3-bis(methoxymethyl)oxetane |
| BFMO | 3,3-bis(fluromethyl)oxetane |
| HMMO | 3-hydroxymethyl-3-methyloxetane |
| BAOMO | 3,3-bis(acetoxymethyl)oxetane |
| BHMO | 3,3-bis(hydroxymethyl)oxetane |
| OMMO | 3-octoxymethyl-3-methyloxetane |
| BMEMO | 3,3-bis(methoxyethoxymethyl)oxetane |
| CMMO | 3-chloromethyl-3-methyloxetane |
| AMMO | 3-azidomethyl-3-methyloxetane |
| BIMO | 3-3-bis(iodomethyl)oxetane |
| IMMO | 3-iodomethyl-3-methyloxetane |
| PMMO | 3-propynomethylmethyloxetane |
| BNMO | 3,3-bis(nitratomethyl)oxetane |
| NMMO | 3-nitratomethyl-3-methyloxetane |
| BMNAMO | 3,3-bis(methylnitraminomethyl)oxetane |
| MNAMMO | 3-methylnitraminomethyl-3-methyloxetane |
| BAMO | 3,3-bis(azidomethyl)oxetane. |

Forming ABA block polymers in accordance with the invention requires (1) formulation of a polymer to serve as the A blocks that is crystalline in nature with a relatively elevated melting point, i.e., between about 60° C. and about 120° C., preferably between 75° C. and 100° C. and most preferably for many applications between about 80° C. and 90° C. and (2) formation of a polymer to serve as the B block that is amorphous in structure having a glass transition temperature ($T_g$) below about −20° C. and preferably below about −40° C.

Examples of suitable crystalline A blocks include polyBEMO, polyBMMO and polyBFMO. Both polyBEMO and polyBMMO melt at between 80° C. and 90° C., and polyBFMO has a melting point of about 105° C. These crystalline homopolymers may be selected as A blocks according to the particular binder requirements. For example polyBMMO has a higher ether oxygen content than polyBEMO, which may be advantageous in particular applications. Although the 80° C. to 90° C. melting point of polyBMMO and polyBEMO are generally preferred, the higher melting temperature of polyBFMO may be preferred in particular binder applications. Also polyBFMO has a higher density than either polyBEMO or polyBMMO which may suit particular binder applications.

The soft or amorphous B block is selected from homopolymers and copolymers (or higher number polymers) found to have low glass transition temperatures. An important class of amorphous blocks in accordance with the invention are copolymers of THF and simple oxetane monomers, including those monomers which form the crystalline homopolymers described above. For example, THF/BEMO, THF/BMMO and THF/BFMO copolymers have been found to be amorphous at ambient temperatures, having low glass transition temperatures. The physical characteristics of these copolymer blocks depend upon the relative proportions of THF and the oxetane monomer, the molar ratios ranging from between 20 and about 80 percent THF mer units. Generally it is found that a molar ratio in the range of 50:50 THF mer unit to oxetane mer unit is preferred, copolymers in this molar range being waxy in nature with glass transition temperatures ranging from −45° C. to −68° C. Polymers having higher THF contents have reduced melting points, which affects the final melt viscosity of the block polymer.

Oxetanes having long or bulky side chains may be copolymerized with THF to provide B blocks which are "internally plasticized". That is, the side chains (R) sterically hinder close packing of polymer chains, contributing to low viscosity and low $T_g$ of the copolymer. Two oxetane monomers which provide internal plasticization in a THF/oxetane copolymer are OMMO and BMEMO. Again, the THF:oxetane molar ratio ranges from about 80:20 to about 20:80 with a molar ratio in the range of 50:50 being preferred.

In addition, homopolymers and copolymers of various energetic oxetanes exhibit amorphous characteristics. B blocks formed with energetic polymers are useful in forming energetic thermoplastic elastomers. High energy polymers and copolymers include, but are not limited to, polyBAMO/AMMO, polyBAMO/BMMO and polyAMMO, the monomers used to form the copolymers being used throughout the entire spectrum of molar ratios, depending upon the physical and energetic characteristics required of the B block. In using the energetic homopolymer or copolymer B blocks to form ABA block polymers, it may be preferred to use nonenergetic A blocks, such as the polyBEMO, polyBMMO and polyBFMO blocks, described above, in order to ensure low vulnerability of the high-energy composition formed therefrom. However, where even higher energy binders are desired or required, it is considered to be within the scope of the present invention to have A blocks similarly formed with high-energy monomers.

The properties of the block polymer depends upon the molecular weights of the individual blocks and the total molecular weights. Typically the A blocks have molecular weights ranging from about 3000 to about 12500 whereas the B block has a molecular weight ranging from about 5000 to about 50,000. Preferably, the A blocks are shorter than the B block, the total molecular weights of the A blocks typically ranging from about 1/5 to 1 times the molecular weight of the B block in a triblock polymer or the total molecular weight of B blocks in an $AB_n$ or star polymer. Typically, the A blocks will have generally similar size. The preferred sizes of the A and B blocks for any particular binder application must be emperically determined.

With respect to polymer molecular weights given herein, the polymers synthesized in accordance with this invention are sufficiently different in structure and molecular weight than molecular weight standards available for calibration that quoting absolute molecular weights according to known protocols is questionable. If commercially available standards (polypropylene glycol (PPG), polyethylene glycol (PEG), etc.) are used, extrapolation outside of the actual range of molecular weights used in the calibration is required, a dubious practice. Obviously molecular weight fractionation of each individual polymer synthesized for the subsequent calibration of the gel permeation chromatography (GPC) would be the ideal case, but as a considerable number of different polymers were synthesized, this was prohibitive. Therefore, a "middle of the road" technique has been used. A series of polymer standards were obtained, none of which describe the polymer systems according to the invention, but each of which describes a possible configuration or molecular weight. These polymers are poly[ethylene oxide], poly[tetrahydrofuran], and poly[glycoladipate]. The retention times of each polymer system were then graphically represented and a least squares plot made. As far as GPC determination of molecular weight is concerned, this calibration curve is used exclusively herein.

Thermoplastic elastomers in accordance with the present invention are admixed with other components of a high-energy formulation, such as a propellant formulation. The binder system, in addition to the TPE may optionally contain a plasticizer at a plasticizer-to-TPE ratio of up to about 2.5:1, suitable high-energy plasticizers including nitroglycerine, butanetriol trinitrate (BTTN), and trimethylolethane trinitrate (TMETN). If the block TPE is internally plasticized, e.g., with OMMO or BEMO as described above, there is less need for external plasticizers, although high-energy nitroester plasticizers may be used to enhance the energy value of the binder system as a whole. The binder system may also contain a minor amount of a wetting agent or lubricant that enables higher solids loading.

The solids content of the high-energy composition generally ranges from about 70 wt. percent to about 90 wt. percent, higher solids loading generally being preferred so long as this is consistent with structural integrity. The solids include fuel material particulates, such as particulate aluminum, and/or oxidizer particulates, such as ammonium perchlorate, cyclotetramethylene tetranitramine (HMX) and cyclotrimethylene trinitramine (RDX). In addition, the high-energy composition may include minor amounts of additional components known in the art, such as bonding agents, burn rate modifiers, etc.

The thermoplastic elastomers may be mixed with the solids and other components of high-energy formulation at temperatures above its melting temperature. Blending is done in conventional mixing apparatus, such as a Branbury mixture. Because of the low viscosities of the molten polymer, no solvents are required for blending or other processing, such as extrusion. An advantage of using thermoplastic elastomers for binders is that there is no need to cast the propellant immediately after mixing, although from an energy efficiency standpoint, this is generally desirable.

An important advantage of having a propellant which is meltable is that the propellant from an outdated missile can be melted down and reused. At the time of such remelting, the propellant might be reformulated, e.g., by addition of additional fuel or oxidizer particulates. Accordingly, the thermoplastic of the propellant composition provides for its eventual recycle, as opposed to the burning required for disposal of thermoset propellant compositions. Because the thermoplastic propellant does not have a "pot life", there are no limitations to the time of casting, and if any problems develop during casting, the process can be delayed as long as necessary merely by maintaining the propellant formulation in molten form.

ABA triblock polymers may be joined together through a block linking technique in which a linking moiety, such as phosgene or an isocyanate, is reacted with both ends of the middle (B) block and the end (A) blocks are subsequently reacted with the linking group(x). Generally the reaction is:

$$B + 2x \longrightarrow xBx \xrightarrow{2A} AxBxA.$$

The monomer blocks may be formed according to the cationic polymerization technique taught by Manser in U.S. Pat. No. 4,393,199, the teachings of which are incorporated herein by reference. The technique employs an adduct of a substance such as a diol, e.g., 1,4-butane diol. (BDO), and a catalyst for cationic polymerization, e.g., $BF_3$-etherate. This adduct forms with the monomer (oxetane or THF) an initiating species which undergoes chain extension until n moles of monomer have been incorporated in the molecule, n being the ratio of monomers to adduct present. By adjusting the ratio of monomers to adduct present, the molecular weight of the polymer which forms may be adjusted. If two monomers are present, e.g., an oxetane and THF or two oxetanes, incorporation of the monomers will be generally random but may depend somewhat upon the relative reactivities of the monomers in the polymerization reaction.

As an alternative to block linking, an ABA polymer may be formed by systematic monomer addition. For example, the A monomer may be reacted with the adduct to form an A block by cationic polymerization and the reaction allowed to proceed until monomer A is substantially exhausted. Then the monomer or monomers of block B are added and polymerization proceeds from the active end of block A. When the monomers of block B are substantially exhausted, monomers of block A are added, and polymerization proceeds from the active end of block B. The reaction is represented by the equation:

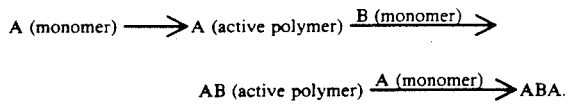

Although the invention is generally described herein in terms of ABA triblock polymers, it is inherent that either block linking or systematic monomer addition may be used to form polymers of $(AB)_n$ structure and also star polymers having both A and B blocks, e.g., by using a multifunctional alcohol as an initiator. Both repeating $AB_n$ polymers and AB star polymers have thermoplastic characteristics useful for forming binders in accordance with the invention, and such polymers are considered to be within the scope of the present invention. In the case of AB star polymers, the B blocks are at the star center and A blocks at the termini.

Synthesis of BAMO and AMMO are described in above-identified U.S. Pat. No. 4,483,978, the teachings of which are incorporated herein by reference.

The invention will now be described in greater detail by way of specific examples.

EXAMPLE 1

3,3-Bis(ethoxymethyl)oxetane (BEMO)

In a 12 liter, five-neck flask, fitted with a stirrer, reflux condenser, and dry nitrogen inlet tube, 8000 ml of absolute ethanol followed by 717.6 g (31.2 mole) of sodium metal were placed. The temperature was maintained at mild reflux by the use of a cold water bath until all of the sodium had dissolved. To the reaction mixture was then added 1200 g (7.7 mole) of 3,3-bis (chloromethyl)oxetane, and the resultant mixture heated to mild reflux for 24 hr. After cooling to room temperature, the reaction products were quenched in 5000 ml of distilled water and then extracted with four portions of 500 ml of methylene chloride. The combined extracts were then dried over magnesium sulfate and the solvent removed by evaporation. Pure monomer was obtained by distillation, the main fraction being collected at 54° C. and 1.6-mm Hg pressure. 1284 g of polymerizable grade monomer were obtained by redistillation from calcium hydride, representing a 95% yield.

EXAMPLE 2

3,3-Bis(methoxymethyl)oxetane (BMMO)

Into a 12 liter, five-neck flask, fitted with a stirrer, reflux condenser, and dry nitrogen inlet tube, 4200 ml of anhydrous methanol followed by 552 g (24 mole) of sodium metal were placed. The temperature was maintained at mild reflux by the use of a cold water bath until all of the sodium had dissolved. To the reactor was then added 1240 g (8 mole) of 3,3-bis(chloromethyl) oxetane, and the resultant mixture was heated to mild reflux for 48 hr. After cooling to room temperature, the reaction products were quenched in 6,000 ml of distilled water, and then extracted with four portions of 500 ml methylene chloride. The combined extracts were then dried over magnesium sulfate and the solvent removed by evaporation. Pure monomer was obtained by distillation, the fraction boiling at 45° C. at 0.3-mm Hg pressure being collected. 1052 g of polymerizable grade monomer was obtained by redistillation from calcium hydride, representing a 90% yield.

EXAMPLE 3

3,3-Bis(fluoromethyl)oxetane (BFMO)

Into a 5 liter, three-neck flask, fitted with a stirrer and reflux condenser, 1000 g (17.2 mole) of potassium fluoride suspended in 2000 ml of anhydrous ethylene glycol were added. To this mixture was then added 1000 g (6.45 mole) 3,3-bis(chloromethyl)oxetene, and the pot temperature was raised slowly to 180° C. After 1 hr at this temperature, the condenser was replaced with a 12-in. vigreaux column and the pot temperature was raised to 190° C. The product was then collected, as formed, from the reactor. After 5 hr, 625 g of material was collected, and redistillation at a boiling point of 49° C. at 155-mm pressure, through a Snyder (floating ball) column, yielded 488 g of product, representing a 62% yield.

EXAMPLE 4

3,3-Bis(methoxyethoxymethyl)oxetane (BMEMO)

To a 5 liter, three-neck flask, fitted with a reflux condenser, a stirrer, and a thermometer, were added 1824 g (24 mole) of 2-methoxyethanol followed by 139 g (6 mole) of sodium metal. The flask temperature was then raised to mild reflux and thus maintained until all the sodium had dissolved. At this time, 465 g (3 mole) of 3,3-bis(chloromethyl)oxetane was added and heating maintained for a further 24 hr. The mixture was then cooled to room temperature and the precipitated sodium chloride removed by filtration. The filtrate was dissolved in an excess of water, extracted with four portions of 500 ml methylene chloride, and then the combined organic layers were dried over magnesium sulfate. The solvent was then removed by evaporation and the required monomer isolated by fractional distillation, the fraction boiling at 85° C. and 0.1-mm pressure being collected. Redistillation from calcium hydride yielded 487 g of polymerizable grade monomer.

Elemental analysis calculated C, 56.4; H, 9.4; found C, 56.1; H, 9.8.

NMR(CDCL$_3$): w 3.36(s,CH$_3$); 3.57(d,OCH$_2$CH$_2$O) J=3; 3.69(s,CH$_2$O); 4.45(s,CH$_2$OCH$_2$).

EXAMPLE 5

3-Chloromethyl-3-methyloxetane (CMMO)

In a 5 liter, three-neck flask, fitted with a stirrer, condenser, and thermometer, were placed 2000 ml of carbon tetrachloride. The flask was heated to reflux, and then 100 ml of solvent was allowed to distill off and remove any residual water. The flask was cooled to room temperature, and to it added 957 g (3.66 mole) of triphenylphosphine and 372 g (3.66 mole) of 3-hydroxymethyl-3-methyloxetane. The mixture was heated with caution to 65° C., at which point a strong exotherm occurs and the reaction becomes self-sustaining. This exothermic reaction continued for 1 hr, at which time external heating was reapplied for an additional 1 hr. The flask was then cooled to room temperature and the resultant precipitate removed by filtration. The filtrate was then dissolved in ether, washed with distilled water, dried over magnesium sulfate, and then evaporated to remove the solvents. Distillation through a Snyder (floating ball) column yielded the required monomer which boiled at 64° C. and 40 mm-pressure. Redistillation yielded 493 g (56 percent yield) of polymerizable grade material.

EXAMPLE 6

3-Octoxymethyl-3-methyloxetane (OMMO)

Into a 5 liter, three-neck flask, fitted with a stirrer, reflux condenser, and nitrogen inlet tube, were placed 245 g (2.4 mole) of 3-hydroxymethyl-3-methyloxetane and 3000 ml of p-dioxane. To this solution 47 g (2 mole) of solid sodium metal was added, and the pot temperature was raised to reflux. Heat was maintained until all of the sodium had dissolved. 400 g (2 mole) of 1-bromooctane was added, and the reflux was resumed for 3 days. The mixture was cooled to room temperature, and the solid sodium bromide was filtered off using celite. The solvent was removed by evaporation and the product was distilled at 80° C. and 0.3-mm pressure. Redistillation from calcium hydride gave 231 g of polymerizable monomer, representing a 58 percent yield.

Element analysis calculated: C, 72.8; H, 12.2; found: C, 72.2; H, 12.6.

NMR(CDCL$_3$): o 0.86(t,CH$_3$); 1.03(m,(CH$_2$)$_6$; ring CH$_3$); 3.45(s,t(CH$_2$OCH$_2$)); 4,31, 4.49(ABq CH$_2$OCH$_2$) J=6.

EXAMPLE 7

Solution Polymerization [e.g., BEMO, BMMO, OMMO/BMMO, BFMO/BEMO, BAMO/BMNO, BNMO/NMMO, etc.]

100 g of calcium hydride-dried methylene chloride is charged into a flame-dried, 500 ml resin flask which is maintained under a nitrogen atmosphere. To this flask is then added the calculated amount of freshly distilled 1,4-butanediol (BDO) followed by the calculated amount of borontrifluoride-etherate (1:2 mole ratio). This solution is allowed to react for 1 hr at room temperature. The reactor is then cooled to −10° C., and after 30 min a solution of the monomer(s) is added dropwise in methylene chloride (25 percent w/w concentration). The rate of addition usually ranges from 20 min to 2 hr. If the rate of polymerization is unknown, the reaction is followed by gas chromatography (GC), until a conversion of greater than 90 percent is measured. At this time the contents of the flask are quenched with 50 ml of saturated brine solution. The organic phase is separated off, washed with 10-percent sodium bicarbonate solution, dried over magnesium sulfate, and evaporated to dryness at room temperature. The nature of the polymer dictates the method of purification. In most cases, a single precipitation from cold methanol yields an acceptable polymer.

EXAMPLE 8

Bulk Polymerization [e.g., BAMO/THF, BFMO/THF, AMMO/THF, BEMO/THF, BMMO/THF, OMMO/THF, BMEMO/THF, etc.]

Into a 500 ml, flame-dried resin flask, which is maintained under a nitrogen atmosphere, is charged a calculated amount of freshly distilled tetrahydrofuran (THF). While maintaining the flask at room temperature, a calculated amount of freshly distilled 1,4-butanediol is added followed by a calculated amount of borontrifluoride-etherate (the amount of BDO controls the final molecular weight). The flask is then cooled to 0° C., and after 60 min., the calculated amount of the second monomer is added in bulk. The rate of addition is governed by the reactivity ratio of the monomer pair, i.e., if the reactivity ratio of the second monomer is significantly different (higher) than that of THF, then the rate of addition is slower. The mole fraction of monomer 2 is maintained in the polymerization at a level which will give an apparently idealized copolymerization at the desired monomers-in-polymer composition. If the rate of polymerization is unknown, the polymerization is followed by GC, until a conversion of greater than 90 percent is measured. At this time, the polymerization is quenched, first by the addition of 100 ml of methylene chloride, followed by the addition of 50 ml of saturated brine solution. The organic layer is then separated, washed with a 100 ml sodium bicarbonate solution, dried over magnesium sulfate, and then evaporated to dryness. THF polymers are readily purified by precipitation from cold methanol.

EXAMPLE 9

Block Linking Technique

Into a 500 ml, flame-dried resin flask is added a solution of the soft block (e.g., BMMO/THF) in dried solvent (benzene, dichloromethane, or tetrachloroethane); the amount of polymer is governed by the equivalent weight of the polymer. A five-times excess of phosgene is then added while maintaining the flask at 25° C. The normal precautions regarding phosgene are carefully followed, including placing a KOH trap at the end of the gas/flask train. The formation of the bischloroformate is allowed to continue for 2 hr, at which time excess phosgene is removed by passing a stream of dry nitrogen through the flask at slightly elevated temperatures. To this solution is quickly added a solution of the end block at an amount required to end-cap the center block. The addition of an HCl scavenger (pyridine, pipyrizine, triethylamine) is normally required for good reaction. At this time, the flask is heated to 60° C. and an immediate rise in viscosity is noted. After this time, the block polymer is be isolated by precipitation from methanol or water. The final polymer may be reprecipitated from methanol.

EXAMPLE 10

BEMO-BAMO/AMMO-BEMO

A flame-dried, 500 ml resin flask was fitted with a stirrer and an additional funnel and was connected to a dry nitrogen line. To the flask were added 50 g of dry methylene chloride followed by 72 ml of freshly distilled (over CaH$_2$) 1,4 butanediol and 202 ml of borontrifluoride-etherate. This solution was then stirred at room temperature for 1 hr before 5 g (0.03 mole) of 3,3-bis(ethoxymethyl)oxetane[BEMO]in 20 g of methylene chloride were added. The BEMO solution was allowed to react for 1 hr and then a solution of 11.3 g (0.07) of 3,3-bis(azidomethyl)oxetane [BAMO] and 8.5 g (0.07) of 3-azidomethyl-3-methyloxetane[AMMO]in 50 g of methylene chloride were added over a 5-min period. Whilst maintained at room temperature, the polymerization was continued for 16 hr. Finally, 5 g (0.03 mole) of BEMO in 30 g of methylene chloride were added and allowed to react for 3 hr before the reaction was quenched with saturated aqueous sodium chloride solution. The water layer was removed, and the organic layer was washed with saturated aqueous sodium bicarbonate solution and dried over magnesium sulfate. After filtering off the solids, the filtrate was concentrated by evaporation and added slowly, with stirring, to a large excess of methanol. The resulting precipitated product was filtered and freeze-dried.

EXAMPLE 11

BEMO-AMMO-BEMO

A flame-dried, 500 ml resin flask was fitted with a stirrer and an additional funnel and was connected to a dry nitrogen line. Into the flask were introduced 50 g of dry methylene chloride followed by 37 ml of freshly distilled (over $CaH_2$) 1-4 butanediol, and 103 ml of borontrifluoride-etherate. This solution was then stirred at room temperature for 1 hr, before 5 g (0.03 mol) of 3,3-bis(ethoxymethyl)oxetane[BEMO]were added. The BEMO solution was allowed to react for 1 hr, and then 9 g (0.07 mol) of 3-azidomethyl-3-methyloxetane[AMMO]in 20 g of methylene chloride were added over a 5-min period and the polymerization allowed to proceed to 16 hr. A sample was removed and analyzed on a gas chromatograph to confirm that the AMMO was over 95 percent converted before the final addition of 5 g of BEMO in 10 g methylene chloride. The reaction was run for three more hours and then quenched using saturated aqueous sodium chloride solution followed by a wash with saturated aqueous sodium bicarbonate solution. After separating the aqueous layer, the organic layer was dried over magnesium sulfate and concentrated by evaporation. The concentrate was then added slowly with stirring to a large excess of methanol. The resulting precipitated product was filtered off and freeze-dried.

EXAMPLE 12

BEMO-BMMO/BAMO-BEMO

A flamed-dried, 500 ml resin flask was fitted with a stirrer and an additional funnel and was connected to a dry nitrogen line. To the flask was added 50 g of dry methylene chloride followed by 184 ml of freshly distilled (over $CaH_2$) 1,4 butanediol and 513 ml of borontrifluoride-etherate. This solution was then stirred at room temperature for 1 hr before 12 g (0.07 mole) of 3,3-bis(ethoxymethyl)oxetane (BEMO) in 20 g of methylene chloride were added. The BEMO solution was allowed to react for 1 hr, and then a solution of 26 g (0.15 mole) of 3,3-bis(azidomethyl)oxetane (BAMO) and 23 g (0.16 mole) of 3,3-bis(methoxymethyl)oxetane (BMMO) in 50 g of methylene chloride were added over a 5-min period. Still at room temperature, the polymerization was allowed to proceed for 16 hr. The final monomer addition of 12 g of BEMO in 30 g of methylene chloride was made and allowed to further react before the reaction was quenched with saturated aqueous sodium chloride solution. The water layer was removed, and the organic layer was washed with saturated aqueous sodium bicarbonate solution and dried over magnesium sulfate. After filtering off the solids, the filtrate was concentrated by evaporation and added slowly, with stirring, to a large excess of methanol. The resulting precipitated product was filtered off and freeze-dried.

EXAMPLE 13

The material that has shown the greatest potential for a first-generation low vulnerability ammunition (LOVA) thermoplastic elastomer (TPE) is the BEMO-BMMO/THF-BEMO triblock polymer. The BEMO blocks were found by GPC to be 6,000 molecular weight and the center block 26,000. The final polymer, after block linking, had a molecular weight of 43,000. The apparent molecular weight discrepancy is likely due to inaccuracies at these higher molecular weights requiring extrapolation above available standards. The polymer "cake" was easily melt castable at 95° C. under vacuum. Naturally, a lower melt viscosity was noted if the casting was done at 110° C. or higher. The melting point of the TPE was determined to be 86° C.

The melt viscosity was determined to be 280 poise at 95° C. When melt cast and cooled to less than 70° C. it was found that the material was very tough and elastomeric. The glass transition temperature was found by differential scanning calorimetry (DSC) to be −53° C. The Instron tester analysis gave a maximum stress of 603 psi at 35-percent elongation at which point necking occurred, and final fracture was noted at 600-percent elongation. This necking is indicative of spherulite formation. A Shore A hardness of 89 was recorded, a value which is in accordance with commercially available TPEs, e.g, Kraton.

Dynamic mechanical properties recorded on the rheometric dynamic spectrometer (RDS) showed extremely good results. The G' [storage(shear modulus)], G" [loss(shear modulus)], G* [complex(shear modulus)], and tan delta plots clearly show that mechanical integrity is maintained up to 75° C., at which point all properties are lost over the next 2° C. The material is extremely tough, if not leathery, and fulfills the basic requirements of a propellant binder.

EXAMPLE 14

The material that shows the greatest potential as a melt cast energetic TPE is BEMO-BAMO/AMMO-BEMO. The added energy content of the amorphous block will certainly increase the energy delivery of a melt cast explosive. G* plotting clearly shows that a rubbery plateau is broad and indicates tough/leathery mechanical behavior. One striking observation is the recovery of the expected melting transition of the crystalline domains. In the BEMO-BMMO/THF-BEMO polymer, partial phase miscibility depresses the melting point onset from 85° to 76° C. The melting point of BEMO-BAMO/AMMO-BEMO is noted at 86° C.; thus indicating no depression of melting point by phase intermixing.

Several block polymers produced in accordance with the invention are found to meet physical and chemical standards considered necessary for further evaluation as gun propellant binders. Specifically these criteria are:
1. Be chemically stable from −40° to 60° C.
2. Be able to increase the energetic nature of formulation.
3. Be processible in state-of-the-art equipment.
4. Be compatible with existing formulation components.
5. Retain mechanical integrity when filled with solids up to 80 weight percent and above.
6. Exhibit endothermic depolymerization at temperatures above 120° C. but below that of the auto-ignition temperature of the oxidizer.
7. Have a $T_g$ below −20° C. and preferably below −40° C.

While the invention has been described in terms of certain preferred embodiments, modifications obvious to one with ordinary skill in the art may be made without departing from the scope of the present invention.

Various features of the invention are set forth in the following claims.

What is claimed:

1. A process of forming a thermoplastic, elastomeric ABA triblock polymer with low melt viscosity, comprising, forming a polymer that is crystalline in structure and has a melting temperature of between about 60° C. and 120° C. to serve as the A blocks;

forming a polymer having a glass transition temperature below about −20° C. to serve as the B block; and forming an ABA block polymer from the A blocks and B block by cationic polymerization;

wherein the A block is a polymer obtained from polymerizing derivatives of oxetane having the general formula:

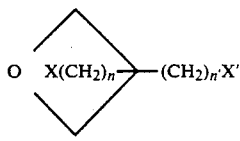

wherein n and n' can be 0 to 10 and X and X' are selected from the group consisting of —H, —NO$_2$, —CH, —Cl, —F, —OR, —OH, —I, —ONO$_2$, —N(NO$_2$)R, —C≡CH, —Br, —CH=CHZ, —O—CO—Z, —CO$_2$—Z, —N(H or R)$_2$ and —O—(CH$_2$)$_{1-5}$—O—(CH$_2$)$_{0-8}$—CH$_3$, where R is an alkyl group and Z is H or R, and wherein the B block is a homopolymer obtained from polymerizing a compound chosen from the group consisting of oxetane, tetrahydrofuran, derivatives of oxetane and derivatives of tetrahydrofuran monomers.

2. A process as recited in claim 1 wherein the B block is a polymer obtained from polymerizing derivatives of tetrahydrofuran having the general formula:

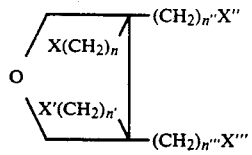

wherein n, n', n'', and n''' can be 0 to 10 and X, X', X'', and X''' are selected from the group consisting of —H, —NO$_2$, —CN, —Cl, —F, —O—R, —OH, —I, —ONO$_2$, —N(NO$_2$)R—N(NO$_2$)-alkyl, —C≡CH, —Br, —CH=CHZ, —O—CO—Z, —CO$_2$—Z, —NZ$_2$, and —O—(CH$_2$)$_{1-5}$—O—(CH$_2$)$_{0-8}$—CH$_3$, where R is an alkyl group and Z is H or R.

3. A product which is produced by the process of claim 2.

4. A process as recited in claim 1 wherein the B block is selected from the group consisting of poly 3-azidomethyl-3-methyloxetane and poly 3-nitramethyl-3-methyloxetane.

5. A process as recited in claim 4 wherein the B block is poly 3-azidomethyl-3-methyloxetane.

6. A product which is produced by the process of claim 4.

7. A product which is produced by the process of claim 1.

* * * * *

UNITED STATES PATENT AND TRADEMARK OFFICE
CERTIFICATE OF CORRECTION

PATENT NO. : 5,210,153
DATED : May 11, 1993
INVENTOR(S) : Gerald E. Manser and Richard S. Miller It is certified that error appears in the above-identified patent and that said Letters Patent is hereby corrected as shown below:

Title page, Assignee was omitted, please add
    Assignee: The United States of America as represented by the Secretary of the Navy, Washington, DC--;
Title page, Attorney, Agent, or Firm was omitted,
    please add --Attorney, Agent, or Firm: Thomas E. McDonnell and Barry A. Edelberg--.

Signed and Sealed this

Twenty-seventh Day of July, 1999

Attest:

Q. TODD DICKINSON

*Attesting Officer*    Acting Commissioner of Patents and Trademarks